H. H. DULEY.
SPRINKLER.
APPLICATION FILED FEB. 24, 1915.
1,169,018.
Patented Jan. 18, 1916.
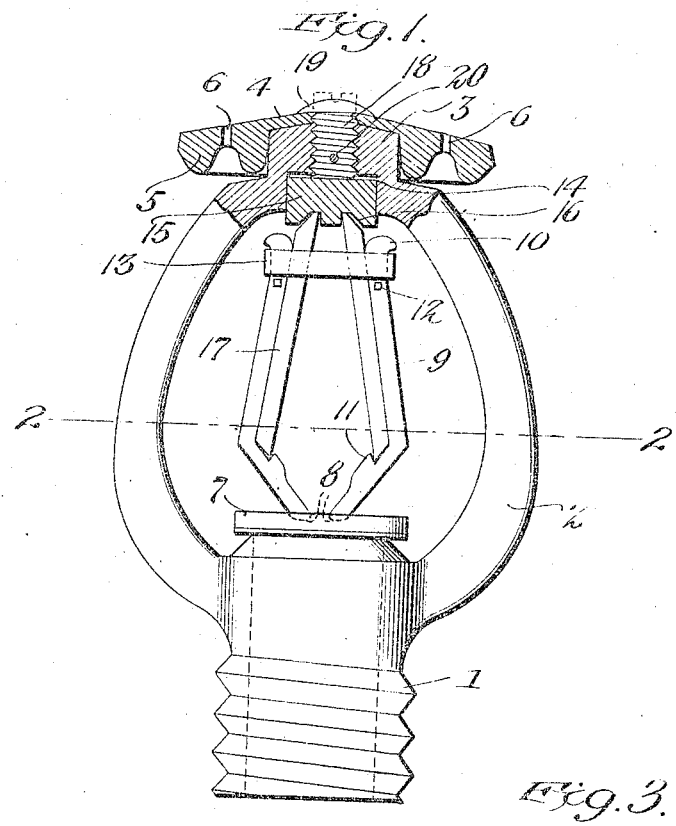
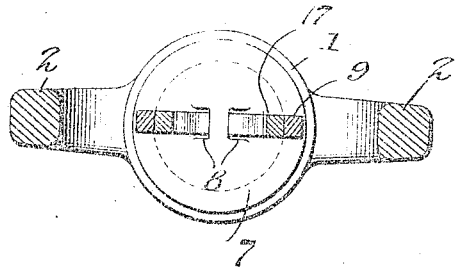
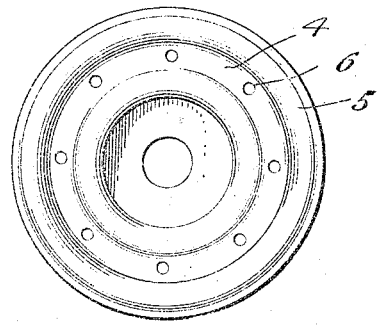
Witnesses
A. V. Doyle
M. E. Laughlin
Inventor
Harley H. Duley,
By Victor J. Evans
Attorney

UNITED STATES PATENT OFFICE.

HARLEY H. DULEY, OF NEW YORK, N. Y.

SPRINKLER.

1,169,018.   Specification of Letters Patent.   Patented Jan. 18, 1916.

Application filed February 24, 1915. Serial No. 10,303.

*To all whom it may concern:*

Be it known that I, HARLEY H. DULEY, a citizen of the United States, residing at New York city, in the county of New York and State of New York, have invented new and useful Improvements in Sprinklers, of which the following is a specification.

This invention relates to automatic sprinklers and it consists in the novel features hereinafter described and claimed.

An object of the invention is to provide an automatic sprinkler of simple and durable structure having a holding member which is fusible at a comparatively low degree of temperature and which when melted by excessive heat releases other members of the structure whereby a water pipe is opened and the water is permitted to flow or sprinkle about the structure and extinguish fire which may be burning in the vicinity thereof.

With the above object in view the sprinkler includes a nipple having a frame mounted thereon and a spreader mounted upon the frame above the outlet opening of the nipple. A valve is arranged to seat upon the outlet opening of the nipple and a series of bars and legs are held in normal position with relation to each other by means of a suitable band or element. A block is adjustably mounted in the upper portion of the frame and means is provided for moving the said block to engage the upper ends of the bars whereby the lower ends of the legs are held against the valve which in turn is securely held in position upon the outlet opening of the nipple. When the temperature of the air in the vicinity of the structure raises, as for instance in the event of fire, the said fusible band is melted and the said bars and legs are permitted to fall by gravity away from each other whereby the valve is forced by the water pressure into the nipple away from its seat and the water may strike the spreader and be deflected in all directions about the sprinkler.

In the accompanying drawing:—Figure 1 is a side elevation of the sprinkler with parts shown in section. Fig. 2 is a horizontal sectional view of the same cut on the line 2—2 of Fig. 1. Fig. 3 is an under plan view of the spreader.

The sprinkler includes a nipple 1 which is adapted to be screw-serted in or otherwise secured to a water supply pipe (not shown). An ovate frame 2 is provided upon the upper portion of the nipple 1 and extends above the upper end thereof. The frame 2 is provided at its upper end with an upwardly disposed lug 3 upon which is seated a spreader 4. The spreader 4 is provided at its under side with a series of concentrically arranged corrugations 5 and apertures 6 pass transversely through the spreader 4 and are located in the valleys between the corrugations 5. A valve 7 is arranged to seat upon the upper or outlet end of the nipple 1 and the said valve is provided at its upper side with notches 8. Legs 9 rest at their lower ends in the notches 8 and the said legs are provided at their upper ends with outwardly disposed heads 10. The upper portions of the legs 9 diverge from each other in a downward direction and the lower portions of the said legs 9 converge toward each other in a downward direction as best shown in Fig. 1 of the drawing. The legs 9 are provided at the inner edges of their lower converging portion with inwardly disposed shoulders 11 and each of the said legs are provided in the vicinity of their upper ends with pins 12 disposed at the sides of the said legs. A band 13 of fusible material, that is to say material which will melt at a comparatively low degree of temperature surrounds the upper portions of the legs 9 between the heads 10 thereof and the pins 12 carried thereby.

The frame 2 is provided at its upper end and at its inner side with a socket 14 in which is movably mounted a block 15. The block 15 is provided at its lower or under side with notches 16 which receive the upper ends of bars 17. Said notches may extend all of the way across the block 15. The lower ends of the bars 17 bear against the upper edges of the shoulders 11 as best shown in Fig. 1 of the drawing. A screw 18 is threaded through the upper end of the frame 2 and the lug 3 thereof and at its lower end engages the upper surface of the block 15. The said screw 18 also passes transversely through the center of the spreader 4. After the screw 18 is inserted in proper position in the upper end of the frame 2 its head may be flattened from the shape shown in dotted lines in Fig. 1 to the shape shown in heavy lines in the said figure thereby forming an overlapping head 19 the edge portions of which bear directly against the upper surface of the spreader 4. When the screw 18 is in proper position in the lug 3 the said screw may be secured with relation to the lug by means of a pin 20 which is passed transversely through the lug and the said screw.

Assuming that the parts are in the positions as shown in Fig. 1 of the drawing and the band 13 is subjected to a comparatively high degree of heat the said band melts and hence the bars 17 and legs 9 are permitted to fall from between the valve 7 and the block 15. Inasmuch as the valve 7 bears against the upper end of the nipple 1 which is connected with the water supply pipe (not shown) the pressure of the water against the under side of the valve 7 forces the said valve away from the nipple 1 and the water squirts up against the under side of the spreader 4 and by the said spreader is deflected in all directions around the sprinkler. Some of the water may pass up through the apertures 6 through the spreader and dampen objects which may be located immediately above the said spreader. Thus it will be seen that when the sprinkler is subjected to unusual conditions, that is to say to an excessive temperature, it automatically operates to release the valve thereby liberating a column of water which is sprinkled about the structure in all directions.

To assemble the parts the valve 7 is placed upon the upper end of the nipple 1 and the lower ends of the legs 9 are placed in the notches 8. The bands 13 is then placed in position around the upper ends of the legs 9 and the bars 17 are extended down through the band 13 and engage with the shoulders 11. The upper ends of the bars 17 are then seated in notches 16 of the block 15 and a screw 18 is turned whereby the said block is forced in a downward direction and the bars 17 bearing against the shoulders 11 hold the legs down securely against the valve 7 thereby holding the said valve in position upon the upper end of the nipple 1. The head 19 of the screw 18 is then flattened as shown in heavy lines in Fig. 1 and consequently the parts cannot be loosened accidently or by mischievous persons but the band 13 must be broken or removed in order to release the valve 7.

From the above description taken in conjunction with the accompanying drawing it will be seen that a sprinkler of simple and durable structure is provided and that the parts mutually coöperate with each other in an automatic manner to release and sprinkle a column of water about the structure when the structure is subjected to an excessive heat.

Having described the invention what is claimed is:—

1. A sprinkler comprising a nipple having a frame mounted thereon, a block movably mounted with relation to the frame, means for moving the block with relation to the frame, a valve arranged to seat upon the nipple, legs arranged to engage the valve and provided at their inner sides with shoulders, bars bearing at their lower ends against the shoulders and at their upper ends engaging the block the end portions of the legs and bars overlapping each other and lying longitudinally in contact with each other and a fusible band surrounding the legs and the bars.

2. A sprinkler comprising a nipple having a frame mounted thereon, a block movably mounted with relation to the nipple, means for moving the block with relation to the nipple, a valve arranged to seat upon the nipple, legs adapted to engage at their lower ends with the said valve, said legs having upper portions diverging downwardly from each other and lower portions converging toward each other, said legs being provided at the inner edges of said converging portions with shoulders, bars bearing at their lower ends against the shoulders and at their upper ends engaging the block and a fusible band surrounding the legs and the bars.

3. A sprinkler comprising a nipple having a frame mounted thereon, a block movably mounted with relation to the frame, means for moving the block with relation to the frame, a valve adapted to seat upon the nipple, legs engageable with the valve for holding the same in position upon the nipple said legs being provided at their upper ends with heads and provided with pins located below the heads, bars engaging at their lower ends the said legs and engaging at their upper ends the blocks and a fusible band surrounding the bars and the legs between the heads of the legs and the said pins.

In testimony whereof I affix my signature in presence of two witnesses.

HARLEY H. DULEY.

Witnesses:
 JOHN A. DONEGLE,
 M. E. LAUGHLIN.